July 15, 1969  M. J. FENLEY, JR  3,455,514
METAL REMOVING TORCH TIP
Filed Nov. 9, 1967
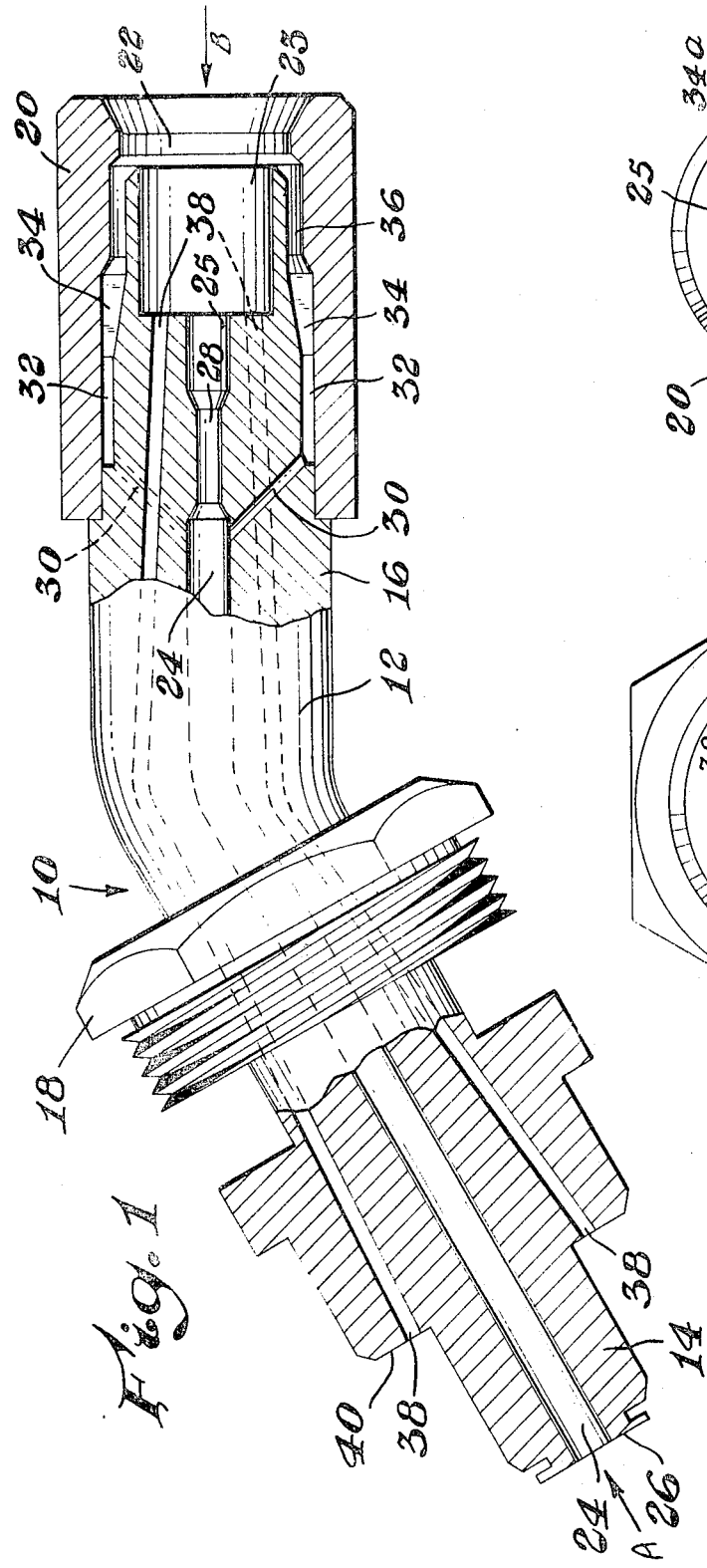
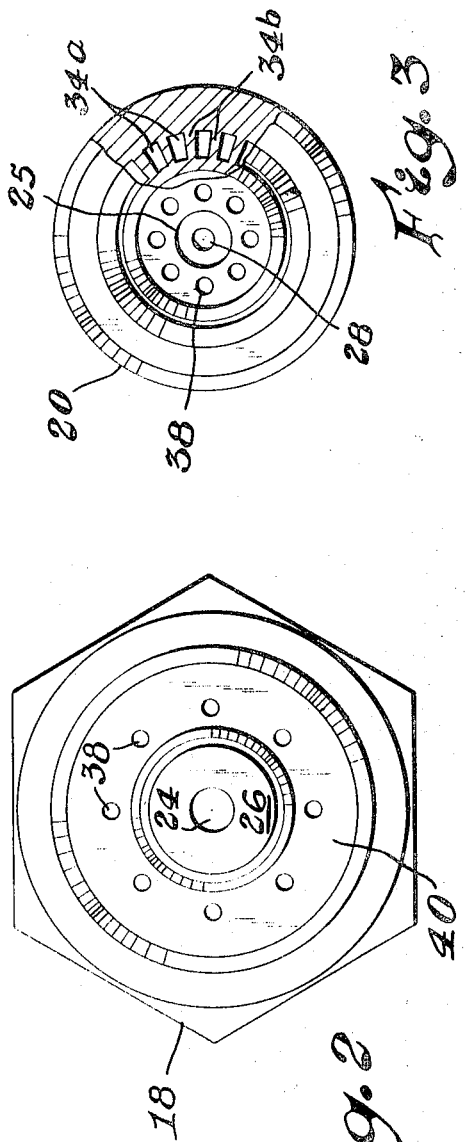
INVENTOR.
Milton J. Fenley, Jr.
BY
AGENT

United States Patent Office 3,455,514
Patented July 15, 1969

3,455,514
METAL REMOVING TORCH TIP
Milton J. Fenley, Jr., Midland, Mich., assignor to The Dow Chemical Company, Midland, Mich., a corporation of Delaware
Filed Nov. 9, 1967, Ser. No. 681,828
Int. Cl. F23d *13/40, 15/00*
U.S. Cl. 239—419                                 4 Claims

ABSTRACT OF THE DISCLOSURE

This invention relates to an improved torch tip useful for metal removing operations such as metal washing, cutting, gouging, descaling, and the like. In the practice of this invention the fuel and oxygen gas mixture used in the metal removing operation is mixed at the discharge end of the torch tip itself to eliminate undesirable "flashback" of the live flame into the torch tip and the torch body itself.

---

In the prior art torch tips commonly used in a metal removing operation, the oxygen-fuel gas mixture required for the preheat flame is generally premixed in the torch body itself or in the seat end of the torch tip. A particular disadvantage in torch assemblies of this type is that when regulating the preheat flame the operator will frequently "over-oxidize" his preheat oxygen-fuel mixture and the resulting rapid propagation of the combustible mixture will carry the flame back into the torch tip, and frequently into the torch body itself. This occurrence, which is generally known in the art as "flashback," is extremely undesirable for obvious reasons; it not only represents a hazard to the operator, but at the same time, it frequently results in premature "burnout" of the torch tip and/or the torch body itself. Although the problem of "flashback" in a torch assembly utilizing the oxygen-fuel premix principle will occur when using fuel gases having a relatively low flame temperature, such as methane (natural gas), propane, butane, or the like, it is particularly manifested when using fuel gases having substantially high flame temperatures, such as acetylene or MAPP gas. MAPP gas is a commercially available acetylenic-type fuel gas comprising basically methylacetylene propadiene or methylacetyleneallene, or mixtures thereof, together with certain "diluent" hydrocarbon components, such as propane or propylene, and four-carbon saturated or ethylenically unsaturated hydrocarbons, such as n-butane, isobutane, outene-1 and -2, isobutene, butadiene, and mixtures thereof. These compositions are more specifically described in U.S. Patents Nos. 3,226,213 and 3,337,314.

Accordingly, it is a principal object of the present invention to provide an improved metal removing torch tip wherein the oxygen and fuel gas are mixed at the discharge end of the torch tip itself, to a alleviate undesirable "flashback" of the combustible mixture into the torch tip and/or the torch body itself.

Another object of this invention is to provide a torch tip in which various conventional fuel gases, such as natural gas, propane, butane, acetylene, MAPP gas, and the like, may be safely and conveniently used in a metal removing operation.

A further object of this invention is to provide a torch tip in which a portion of the high pressure oxygen supply is diverted to the periphery of the main oxygen-fuel gas stream to enhance combustion of the fuel-oxygen mixture and to prevent excessive flame heating of the combustion cap forming a part of the discharge end of the torch tip.

Other objects and advantages of this invention will be apparent from reference to the following description taken in conjunction with the accompanying drawings, in which:

FIG. 1 is a side elevational view, partly in section, of a torch tip according to this invention.

FIG. 2 is a cross-sectional view, taken in the direction of arrow A, of the head end of the torch tip as shown in FIG. 1.

FIG. 3 is a cross-sectional view, partly broken away, taken in the direction of arrow B, of the discharge end of the torch tip shown in FIG. 1.

Briefly stated, the torch tip of this invention consists basically of a generally cylindrical nozzle member having a head end and a discharge end. The head end of the nozzle is adapted for connection to any of the various conventional torch bodies and a combustion cap fitted onto the discharge end of the nozzle defines an auxiliary chamber, an equalizing chamber, and a combustion chamber for distribution, mixing and combustion of the oxygen-fuel gas mixture. The primary (high pressure) oxygen supply from the torch body is conducted to the combustion chamber through a centrally located main channel in the nozzle member. The fuel gas supply from the torch head is conducted to the combustion chamber through several smaller channels surrounding the main oxygen supply channel in the nozzle member. Branching off from the main oxygen supply channel, near the discharge end of the nozzle member, are several smaller diverter channels which communicate with an auxiliary chamber formed by enclosure of the combustion cap over an annular peripherial groove in the nozzle member. The diverter channels serve to divert a portion of the main oxygen supply through the auxiliary chamber into the equalizing chamber and thence into the periphery of the combustion chamber.

This invention can be best understood from the following description taken in conjunction with the accompanying drawings. The drawings illustrate only one of numerous embodiments within the scope of this invention and the form shown is selected for the purpose of convenient illustration and clear demonstation of the principles involved. Corresponding parts of the illustrated embodiments are designated with the same reference numerals, with suffixes being applied where appropriate.

Referring to the drawings, FIG. 1 illustrates a torch tip according to this invention, as indicated generally by reference numeral 10. Basically, tip 10 includes a nozzle member 12 having a head end 14 and a discharge end 16. Means for attaching tip 10 to any of the various conventional torch bodies is provided by a union nut 18 mounted immediately behind head end 14 of nozzle member 12. Attached to and forming a part of discharge end 16 of nozzle member 12 is a combustion cap 20, which, in cooperation with discharge end 16, defines a combustion chamber 22 for combustion of the oxygen and fuel gas mixtures used in the metal removing operation. The primary (high pressure) oxygen supply from the torch body is conducted through a main channel 24, which is positioned centrally in nozzle member 12 and extends from shoulder 26 of head end 14 into a discharge chamber 23, as defined by a generally cylindrical recess in discharge end 16.

The forward end of oxygen supply channel 24, which opens into discharge chamber 23, forms an outlet portion 25, which narrows down at its rear end to define a constriction or neck portion 28. Immediately adjacent the opposite end of neck portion 28 are several diverter channels 30, which branch off from oxygen channel supply channel 24 at an acute angle to communicate with an auxiliary chamber 32. The space comprising auxiliary chamber 32 is formed by enclosure of combustion cap 20 over an annular peripheral groove in the discharge end of nozzle member 12 and a spline section 34 forming one boundary of the groove. Spline section 34, which extends lengthwise along the periphery of nozzle member 12, comprises a series of generally wedge-shaped spline members 34a, which are equidistantly-spaced apart to provide open passageways 34b therebetween, as best shown in FIG. 3. Spline section 34 serves as a divider between auxiliary chamber 32 and an equilizing chamber 36. Chamber 36 comprises a spaced formed between the outer wall of discharge chamber 23 and the inner wall of combustion cap 20. A portion of the high pressure oxygen supply traveling through main channel 24 is deflected through diverter channels 30 into auxiliary chamber 32 and through passageways 34b into equalizing chamber 36 and then into combustion chamber 22. The fuel gas used in the metal removing operation reaches discharge chamber 23 from the torch body by traveling through a series of fuel supply channels 38, which encircle oxygen supply channel 24 and diverge longitudinally through nozzle member 12 from shoulder 40 of head end 14 into discharge chamber 23.

Certain structural details of a torch tip of this invention will now be described, it being understood that these details merely represent the construction of a preferred embodiment of this torch tip and are not intended to limit the invention to the specifications set out hereinafter. The diameter of main channel 24 is about 0.15625 in. (5/32 in. drill) and neck portion 28 thereof has a diameter of about 0.1405 in. (No. 28 drill) and a length of about 5/16 in. The length of outlet portion 25 in channel 24 is about 1/4 in. and the diameter is the same as that of the main portion of the channel, that is, about 0.15625 in. Diverter channels 30, which comprise a series of eight (8) channels having a diameter of about 0.410 in. (No. 59 drill), branch off of channel 24 at a 45° angle to intersect with auxiliary chamber 32. Auxiliary chamber 32 has a depth of about 0.0630 in. and a length of about 11/32 in. Spline section 34 comprises a series of twenty-four (24) spline members (34a), which measure about 1/32 in. high by 0.325 in. wide by 1/4 in. long. Equalizing chamber 36 has a depth of about 0.018 in. and a length of about 5/16 in. Fuel supply channels 38, which lie between diverter channels 30 in the discharge end of nozzle member 12, comprise a series of eight (8) channels having a diameter of about 0.0520 in. (No. 55 drill). Discharge chamber 23 has a diameter of about 5/16 in. and a length of about 3/8 in. The flat portion of combustion chamber 22, that is, the portion immediately adjacent to discharge chamber 23, has a diameter of about 13/32 in. and a length of about 3/32 in.; whereas the tapered portion of the chamber immediately ahead of the flat portion has a length of about 5/32 in. and the walls flare outwardly to a maximum diameter of about 17/32 in. at the tip face of combustion cap 20.

In a conventional, hand operated torch used for metal washing, cutting and similar operations, the high pressure oxygen supply is controlled by a spring-loaded valve which is operated manually by an exterior lever on the torch body. This valve is normally set in the "shut" position and is opened during operation of the torch by exerting hand pressure on the lever. In addition, when a torch tip employing the oxygen and fuel premix principle is used with such a torch body, the required oxygen and fuel supply for the preheat flame is regulated by two needle valves operated by exterior knobs on the torch body. The valve controlling the preheat oxygen is generally designated as a compensator valve.

In a typical metal washing operation according to the practice of this invention, the head end 14 of torch tip 10 is seated in a conventional torch body (not shown) so that the high pressure oxygen supply channel 24 and fuel supply channels 38 mate with the respective high pressure oxygen and fuel supply lines in the torch body. An appropriate amount of fuel gas is then released from the torch body so that it travels through fuel supply channels 38 of torch tip 10 and into discharge chamber 23. The fuel gas vapors released into discharge chamber 23 then flow outwardly into combustion chamber 22 where they mix with atmospheric oxygen at the periphery of the combustion chamber. The combustible mixture is then ignited and, simultaneously, the high pressure oxygen line in the torch body is opened to provide the desired "washing" flame. When the high pressure oxygen is released from the torch body it travels along oxygen supply channel 24 of nozzle member 12, passing through neck portion 28 and outlet portion 25 of the channel, and into discharge chamber 23. When the high pressure oxygen stream flows into chamber 23, the outwardly expanding periphery of the stream forms a "dead" space or partial vacuum at the rear of chamber 23, which has an aspirating action on the fuel gas flowing out of channels 38. The resulting oxygen-fuel gas stream, which flows into combustion chamber 22, is too rich in fuel for adequate combustion and must be supplemented by mixture with an additional or secondary oxygen supply. This secondary oxygen supply is provided by a portion of the high pressure oxygen stream which is deflected through diverter channels 30, into auxiliary chamber 32, through open passageways 34b in spline section 34, into equalizing chamber 36, and thence into combustion chamber 22, where it mixes with the periphery of the fuel-rich stream flowing out of discharge chamber 23. This peripheral ring of oxygen in combustion chamber 22, therefore, not only provides the desired combustible mixture, but it also serves as a cushion to prevent excessive flame heating of combustion cap 20.

Diversion of the secondary oxygen stream from channel 24 into channels 30 is aided by a beveled shoulder formed in channel 24 by neck portion 28. In addition to this function, neck portion 28 also acts as a metering orifice to control the flow rate of the high pressure oxygen stream into outlet portion 25 of channel 24 and thence into discharge chamber 23. Spline section 34, which lies between auxiliary chamber 32 and equalizing chamber 36, has a two-fold purpose:

(1) It lends extra support to combustion cap 20 against the possibility of accidental dislodgement of the combustion cap from its axial alignment with the discharge end of nozzle member 12 and, (2) Passageway 34b in the spline section act as spacers to evenly distribute the flow of the secondary oxygen supply from auxiliary chamber 32 into equalizing chamber 36.

As those skilled in the art will appreciate, when the torch tip of this invention is used with a conventional torch body, the compensator valve which regulates the preheat oxygen supply is kept tightly closed during the entire metal removing operation. This prevents any premixing of the oxygen and fuel in the torch body itself and alleviates the hazard of "flashback" inherent in the prior art torch tips. A particularly suitable application of the present torch tip is in a metal washing operation, such as, for example, removal of excess metal such as risers, fins and other imperfections from ferrous metal castings. It is contemplated to be within the scope of this invention, however, that the present torch tip would be equally useful in various other metal removing operations such as metal cutting, gouging, descaling and the like.

What is claimed is:

1. A torch tip adapted for use with a standard torch body in a meal removing operation, including, in combination;

a nozzle member and a combustion cap;

the nozzle member having a head end and a discharge end, with a generally cylindrical recess in the discharge end defining a discharge chamber;

the combustion cap being fitted over the discharge end of said nozzle member such that the inner wall of the combustion cap bears against a spline section integral with and encircling the outer wall of the discharge end, said spline section comprising a series of spline members spaced apart to define open passageways therebetween;

the inner wall of the combustion cap being spaced apart from the outer wall of the discharge end of the nozzle member, on either side of the spline section, to define an auxiliary chamber and an equalizing chamber, and the distal end of the combustion cap being open to define a combustion chamber spaced apart from and axially aligned with the discharge chamber;

an oxygen supply channel positioned centrally within the nozzle member and extending longitudinally therethrough from the head end into the discharge chamber, for conducting a high pressure oxygen supply into said discharge chamber;

means positioned in the nozzle member connecting the oxygen supply channel with the auxiliary chamber for diverting a portion of said oxygen supply into the auxiliary chamber and through the open passageways in the spline section into the equalizing chamber, and then into said combustion chamber; and a series of fuel supply channels encircling the oxygen supply channel and diverging longitudinally through the nozzle member from the head end into the discharge chamber, for conducting a supply of fuel gas into the discharge chamber.

2. A torch tip as defined in claim 1 wherein a series of diverter channels branch off from the oxygen supply channel to communicate with the auxiliary chamber, said diverter channels being positioned in the nozzle member so as to lie between the fuel supply channels therein.

3. A torch tip as defined in claim 2 wherein the diverter channels branch off from the oxygen supply channel immediately adjacent to a beveled shoulder in the oxygen supply channel, said shoulder being defined by a neck portion formed in the oxygen supply channel.

4. A torch tip as defined in claim 3 wherein the diverter channels diverge from the oxygen supply channel at an angle of about 45 degrees.

References Cited

UNITED STATES PATENTS 589,342  8/1897  Dolan _____ 239—419

FOREIGN PATENTS 1,255,650  1/1961  France.

EVERETT W. KIRBY, Primary Examiner

U.S. Cl. X.R.

239—422, 427.5; 431—353

PO-1050
(5/69)

UNITED STATES PATENT OFFICE
CERTIFICATE OF CORRECTION

Patent No. 3,455,514     Dated July 15, 1969

Inventor(s) Milton J. Fenley, Jr.

It is certified that error appears in the above-identified patent and that said Letters Patent are hereby corrected as shown below:

Column 4, line 61, for "meal" read -- metal --.

SIGNED AND
SEALED

SEP 30 1969

(SEAL)
Attest:

Edward M. Fletcher, Jr.
Attesting Officer

WILLIAM E. SCHUYLER, JR.
Commissioner of Patents